(12) United States Patent
Kondo et al.

(10) Patent No.: US 7,002,587 B2
(45) Date of Patent: Feb. 21, 2006

(54) SEMICONDUCTOR DEVICE, IMAGE DATA PROCESSING APPARATUS AND METHOD

(75) Inventors: Tetsujiro Kondo, Tokyo (JP); Hideo Nakaya, Kanagawa (JP); Kazutaka Ando, Kanagawa (JP); Shizuo Chikaoka, Tokyo (JP); Tsutomu Watanabe, Kanagawa (JP); Tsutomu Ichikawa, Kanagawa (JP); Yasunobu Node, Tokyo (JP); Yoshiaki Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 72 days.

(21) Appl. No.: 10/640,380

(22) Filed: Aug. 14, 2003

(65) Prior Publication Data
US 2004/0164322 A1     Aug. 26, 2004

(30) Foreign Application Priority Data
Dec. 9, 2002   (JP)   ............................ 2002-356530

(51) Int. Cl.
*G09G 5/39* (2006.01)
(52) U.S. Cl. ...................... 345/531; 345/519; 345/572
(58) Field of Classification Search ................ 345/503, 345/519, 531, 545, 556, 565, 564, 572, 501, 345/530; 348/416.1, 716
See application file for complete search history.

(56) References Cited

U.S. PATENT DOCUMENTS

| | | | | |
|---|---|---|---|---|
| 5,659,363 A | * | 8/1997 | Wilkinson | ............. 375/240.11 |
| 5,978,303 A | * | 11/1999 | Takasugi et al. | ........ 365/230.03 |
| 6,122,442 A | * | 9/2000 | Purcell et al. | .............. 345/620 |
| 6,314,048 B1 | * | 11/2001 | Ishikawa | ............... 365/230.06 |
| 6,342,895 B1 | * | 1/2002 | Kim | .......................... 345/531 |
| 6,349,154 B1 | * | 2/2002 | Kleihorst | .................... 382/299 |
| RE37,944 E | * | 12/2002 | Fielder et al. | .............. 345/519 |
| 2003/0161399 A1 | * | 8/2003 | Ali | ........................ 375/240.08 |
| 2003/0235304 A1 | * | 12/2003 | Evans et al. | ................. 380/216 |
| 2004/0165776 A1 | * | 8/2004 | Brouwer | .................... 382/181 |

* cited by examiner

*Primary Examiner*—Kee M. Tung
(74) *Attorney, Agent, or Firm*—Oblon, Spivak, McClelland, Maier & Neustadt, P.C.

(57) ABSTRACT

A semiconductor device and an image data processing apparatus are capable of easily realizing address control, simplifying a circuit for address control, and easily realizing access to image data while reducing the volumes of pieces of image data of different resolutions in different hierarchies. In the image data processing apparatus, a memory cell array stores pieces of composite data, each containing a piece of pixel data and additional information data, for example, a motion vector associated with the pixel data. A designated pixel data and a motion vector associated with the pixel data are read out and a search region is suitably predicted and set up on the basis of the motion vector, and motion estimation is performed in the search region, for example, by a block matching process. Accordingly, motion estimation can be performed in a small search region equivalent to a large search region having been generally used for motion estimation, to realize high-speed, high-efficient motion estimation and improve the estimation accuracy.

39 Claims, 11 Drawing Sheets

F I G. 6
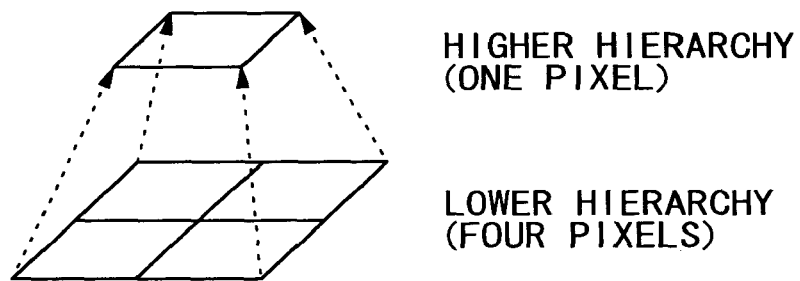
F I G. 7
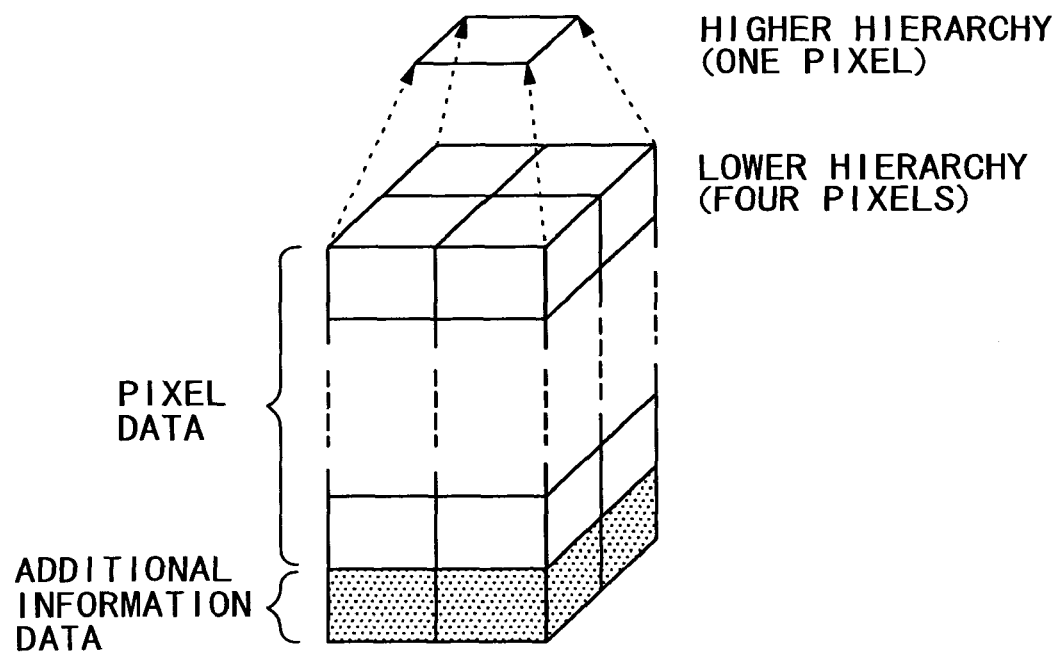

F I G. 9
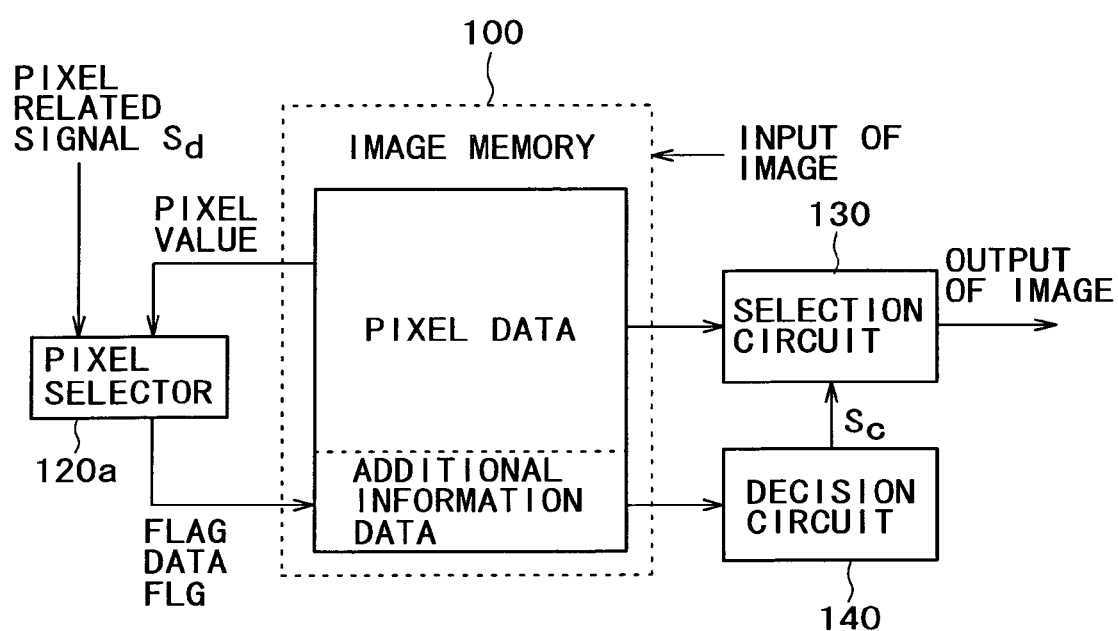

DATA ON SCANNING
DIRECTION

SEMICONDUCTOR DEVICE, IMAGE DATA PROCESSING APPARATUS AND METHOD

CROSS-REFERENCE TO RELATED PATENT APPLICATION

The present application contains subject matter related to co-pending U.S. patent application, Ser. No. 10/640614, filed Aug. 14, 2003, commonly owned by Sony Corporation, having a common inventor Tetsujiro Kondo, based on Japanese priority documents JP 2002-274059, filed in the JPO on Aug. 15, 2002, and JP 2002-274058, filed in the JPO on Aug. 15, 2002, the entire contents of each of which being incorporated herein by reference. The present application also contain subject matter related to Japanese priority document JP 2002-356530, filed in Japan on Dec. 9, 2002, the entire contents of which being incorporated herein by reference.

BACKGROUND OF THE INVENTION

1. Field of the Invention

The present invention relates to a semiconductor device, for example, a semiconductor device including a storing mechanism for allowing write-in or read-out operations as one access unit of a piece of composite data containing a piece of main data and additional information data and an accessing mechanism for performing the write-in or read-out operation. More particularly, the present invention relates to systems, methods and computer program product that include the storing mechanism and the accessing mechanism on one semiconductor chip. The present invention also relates to an image data processing apparatus for processing a piece of composite data containing pieces of an image data and additional information data associated with the image data.

2. Discussion of the Background

According to related art semiconductor devices containing data storing mechanisms that handle a piece of composite data containing a piece of main data and additional information data associated with the main data, the main data and the additional information data have been, in general, separately stored and separately written in or read out. In particular, in related art image data processing apparatuses, image data and additional information data associated with the image data have been, in general, separately stored in respective memories and separately handled, wherein the image data and the additional information data have been separately read out from the memories and separately processed.

On the other hand, in a memory block for storing image data and additional information data associated therewith, image data has been written or read in or from the memory block on the basis of an address designated from an externally originated request. Accordingly, in the case of writing or reading a plurality of pieces of image data in or from the memory block by one access, addresses have been designated one-by-one sequentially from a specific starting position, and pieces of image data have been sequentially read or written in or from memory locations designated by the addresses.

In the case of handling pieces of image data having a hierarchy structure, for example, pieces of image data identical in content but different in resolution, pieces of pixel data having different resolutions have been separately stored in respective memories. Accordingly, in the case of handling image data having different resolutions, pieces of image data have been separately read or written from or in the memories on the basis of respective designated addresses.

In the above-described related art image data processing apparatus, access to image data is generally performed on the basis of an address designated from an external requesting source. Accordingly, for example, in a processing operation such as motion estimation, if it is intended to realize high-speed, high-efficient motion detection by reducing the offset and area of a search region on the basis of a motion vector detected by image data in the previous frame, there occur inconveniences such as complicated address control at the time of memory access, and that a multiplicity of circuit portions for address control must be provided and thereby the scale of the processing circuit must be increased.

In the case of forming pieces of image data in hierarchies having different resolutions, it is required that pieces of image data are stored for each hierarchy having the corresponding resolution, and when performing data processing, pieces of image data are written or read out by access to separate memories storing pieces of image data having different resolutions. Accordingly, there occurs an inconvenience that access to image data becomes complicated and the volumes of memory for storing data becomes large, with an increase in the number of the hierarchies.

In the case of acquiring all pieces of pixel data in a specific object stored in image memories, it is required to sequentially designate addresses of the memories, in which all the pieces of pixel data in the object remain as stored, from external to the memories and to sequentially read all the pieces of pixel data from the designated memories. In this case, there occurs an inconvenience related to complicated address control, to reduce the degree of freedom in address control at the time of reading the image data.

SUMMARY OF THE INVENTION

An object of the present invention is to address and resolve the above-identified and other limitations with conventional devices and methods.

An aspect of the present invention is that it provides a semiconductor device and an image data processing apparatus, which are capable of easily realizing address control in the case of handling composite data, simplifying a circuit for address control, and easily realizing access to pieces of image data in hierarchies having different resolutions while reducing the volume of the pieces of the image data.

Accordingly, a first aspect of the present invention is to provide a semiconductor device including a memory configured to store therein a unit of composite data, the unit of composite data including a main data component configured to hold main data, and an additional information component, configured to hold therein additional information related to the main data; and an access mechanism configured to provide at least one of read and write memory access for the unit of composite data, wherein the main data component and the additional information component are handled as a unit by the access mechanism.

According to a second aspect of the present invention, an image data processing apparatus is provided. The apparatus includes a memory configured to store therein a unit of composite data, the unit of composite data including a pixel data component configured to hold pixel data, and an additional information component, configured to hold therein additional information related to the pixel data; and an access mechanism configured to read and the unit of composite data, the pixel data component and the additional information component being handled as a unit by the access mechanism. The apparatus also includes a separating mechanism configured to separate the composite data, which has been read out by the access mechanism, into the pixel data and the additional information, and a data processing section configured to performing a predetermined processing operation on the pixel data using the additional information data.

According to a third aspect of the present invention, a method for organizing image data is provided. The method includes steps of storing in memory a unit of composite data, the unit of composite data including a main data component configured to hold main data, and an additional information component, configured to hold therein additional information related to the main data. The method also includes steps of providing via an access mechanism at least one of read and write memory access for the unit of composite data, wherein the main data component and the additional information component are handled as a unit by the access mechanism.

According to a fourth aspect of the present invention, a method for organizing image data is provided. The method includes steps of storing in memory a unit of composite data, the unit of composite data including a pixel data component configured to hold pixel data, and an additional information component, configured to hold therein additional information related to the pixel data. The method also includes steps of reading the unit of composite data, the pixel data component and the additional information component being retrieved as a unit, separating the composite data into the pixel data and the additional information, and processing the pixel data using the additional information data.

BRIEF DESCRIPTION OF THE DRAWINGS

These and other objects of the invention will be seen by reference to the description, taken in connection with the accompanying drawing, in which:

FIG. 6 is a conceptual diagram showing pieces of pixel data in a higher hierarchy and a lower hierarchy;

FIG. 7 is a conceptual diagram showing a piece of pixel data and additional information data stored in an image memory;

FIG. 9 is a block diagram showing another configuration example of the second embodiment of the image data processing apparatus;

DETAILED DESCRIPTION OF THE PREFERRED EMBODIMENTS

Hereinafter, embodiments of the present invention will be described with reference to the accompanying drawings.

Figure 1:
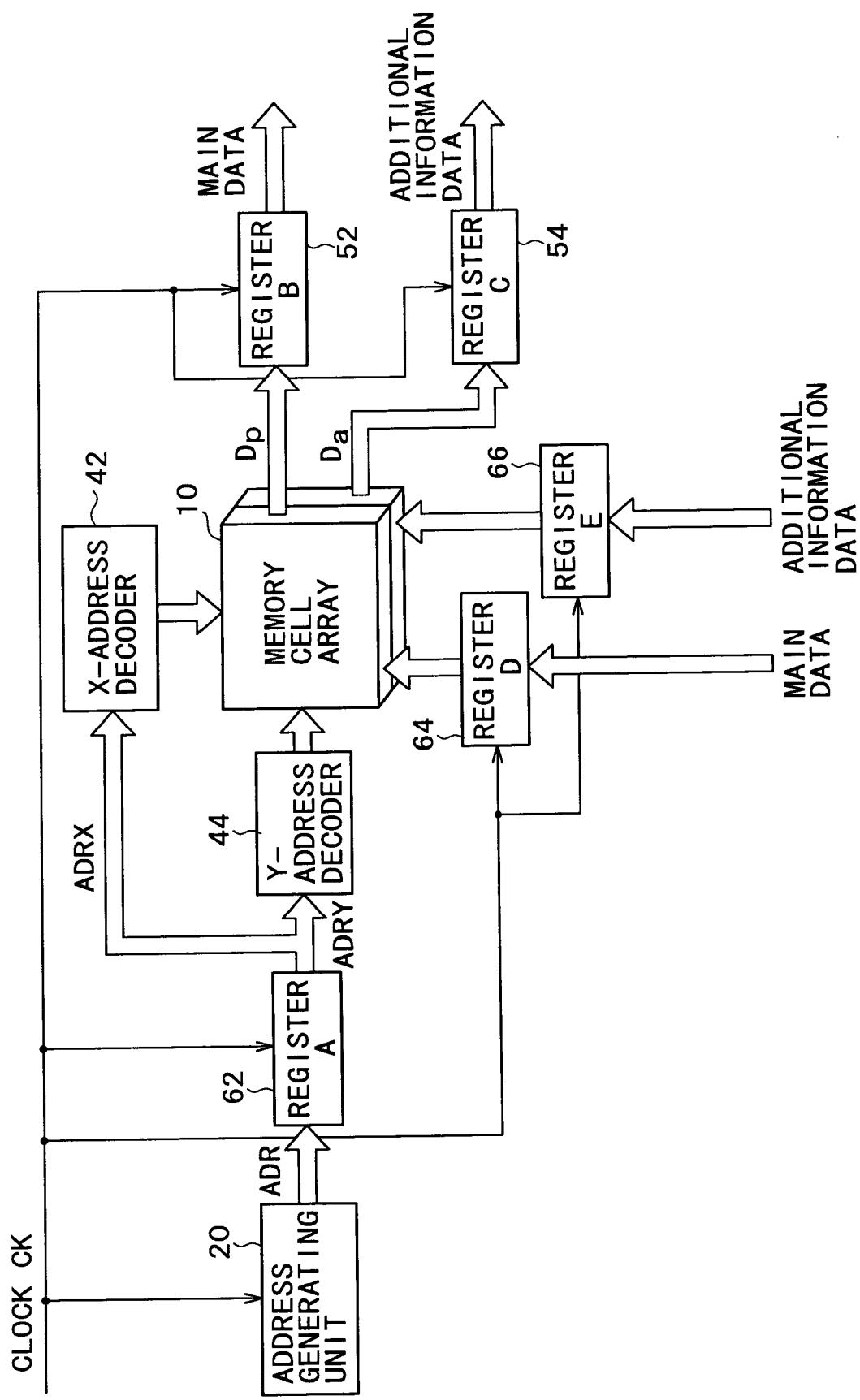
FIG. 1 is a configuration diagram showing one embodiment of a semiconductor device of the present invention.

FIG. 1 is a configuration diagram showing one embodiment of a semiconductor device of the present invention.

As shown in FIG. 1, a semiconductor device of the present invention has a memory cell array 10, an address generating unit 20, address decoders 42 and 44, and registers 52, 54, 62, 64, and 66.

According to the semiconductor device in this embodiment, the memory cell array 10 stores pieces of composite data each containing a piece of main data and additional information data, wherein each piece of the composite data is taken as one access unit. The term "access unit" used herein means a unit of access to data in the memory cell array 10. Specifically, pieces of data are written or read in or from the memory cell array 10 in units of a piece of the composite data. If a piece of the main data has 16-bits and the additional information data has 4-bits, a piece of the composite data containing the main data and the additional information data has 20-bits. Each piece of the composite data of 20-bits is collectively written or read as one unit in or from the memory cell array 10.

The components of the semiconductor device shown in FIG. 1 will be described below.

The memory cell array 10 includes a plurality of memory cells arrayed, for example, in a matrix, and word lines extending along respective rows of the matrix and bit lines extending along respective columns of the matrix. When a word line is designated, memory cells connected to the word line are designated, whereas when a bit line is designated, memory cells connected to the bit line are designated. Data is written in a designated memory cell via the bit line, and data stored in a designated memory cell is read out via the bit line.

Accordingly, by designating a word line and a bit line, a memory cell at an intersection between the designated word line and bit line is selected, and data is written or read in or from the selected memory cell.

According to the memory cell array 10 in this embodiment, access to data is performed on a unit of a piece of the composite data. Specifically, memory cells of the number corresponding to the number of bits of a piece of the composite data are collectively selected upon each writing or reading operation.

The address generating unit 20 generates an address ADR for addressing a memory region of the memory cell array 10 from or in which a piece of the composite data is to be written or read. For example, the address generating unit 20 is configured as a counter, which generates the address ADR on the basis of a clock signal CK and supplies the address ADR to the register 62.

The address ADR generated by the address generating unit 20 is composed of an X-address ADRX for addressing specific columns and a Y-address ADRY for addressing specific rows. The X-address ADRX is inputted in the X-address decoder 42, and the Y-address ADRY is inputted in the Y-address decoder 44.

On the basis of the inputted X-address (column address), the X-address decoder 42 selects only the addressed columns among a plurality of columns in the memory cell array 10. According to the semiconductor device in this embodiment, a plurality of memory cells are designated by one access. To be more specific, the X-address decoder 42 selects a plurality of bit lines on the basis of the inputted column address ADRX.

On the basis of the inputted Y-address (row address), the Y-address decoder 44 selects only the designated rows among a plurality of rows in the memory cell array 10.

The register 64 holds each piece of the main data to be written, and the register 66 holds the additional information data associated with the main data to be written. As described above, according to the semiconductor device in this embodiment, data is written on a unit of a piece of the composite data. To be more specific, a piece of the main data held in the register 64 and the additional information data held in the register 66 are collectively written in a designated region of the memory cell array 10 by one writing operation.

The register 52 holds each piece of the main data read from the memory cell array 10, and the register 54 holds the additional information data associated with the main data read from the memory cell array 10. According to the semiconductor device in this embodiment, data is also read on a unit of a piece of the composite data. To be more specific, a piece of the composite data is read from the designated region of the memory cell array 10 by one reading operation. The main data contained in the composite data is held in the register 52, and the additional information data contained in the composite data is held in the register 54. The main data and the additional information data held in the registers 52 and 54 are outputted to external, respectively.

According to the semiconductor device having the above-described configuration in this embodiment, on the basis of the address ADR generated by the address generating unit 20, specific bit lines and word lines in the memory cell array 10 are respectively selected by the X-address decoder 42 and the Y-address decoder 44, and correspondingly, memory cells of the number corresponding to the number of bits of a piece of the composite data are designated. Upon executing a writing operation, a piece of the composite data composed of a piece of the main data and the additional information data held in the registers 64 and 66 is collectively written in the designated memory cells. Upon executing a reading operation, a piece of the composite data of a plurality of bits is collectively written from the designated memory cells. The main data contained in the composite data is held in the register 52 and the additional information data is held in the register 54. The main data and the additional information data held in the registers 52 and 54 are then outputted external to the semiconductor device.

In this way, according to the semiconductor device in this embodiment, data is written or read in or from the memory cell array 10 on a unit of a piece of the composite data. This is advantageous in realizing high-speed data access. In the related art method of storing data while separately handling a piece of main data and additional information data, the main data and the additional information data are separately written or read in or from a memory. On the contrary, according to this embodiment, a piece of the composite data containing a piece of main data and additional information data can be collectively written or read in or from the memory cell array 10 by one access. Accordingly, it is possible not only to realize high-speed data access, but also to simplify the configuration of a peripheral circuit for controlling the write-in and read-out of data and hence to reduce the circuit scale.

In the semiconductor device shown in FIG. 1, the components including the memory cell array 10 and the address generating unit 20 are all formed, together with a different data processing circuit for handling decode data, on one semiconductor chip. As a result, large-scale function circuits can be integrated on one semiconductor chip, and thereby complicated data processing functions may be performed on the one chip. This makes it possible to realize high-speed processing, to miniaturize the semiconductor equipment, and reduce power consumption.

Some embodiments of an image data processing apparatus to which the above-described semiconductor device of the present invention is applied will be hereinafter described.

First Embodiment

Figure 2:
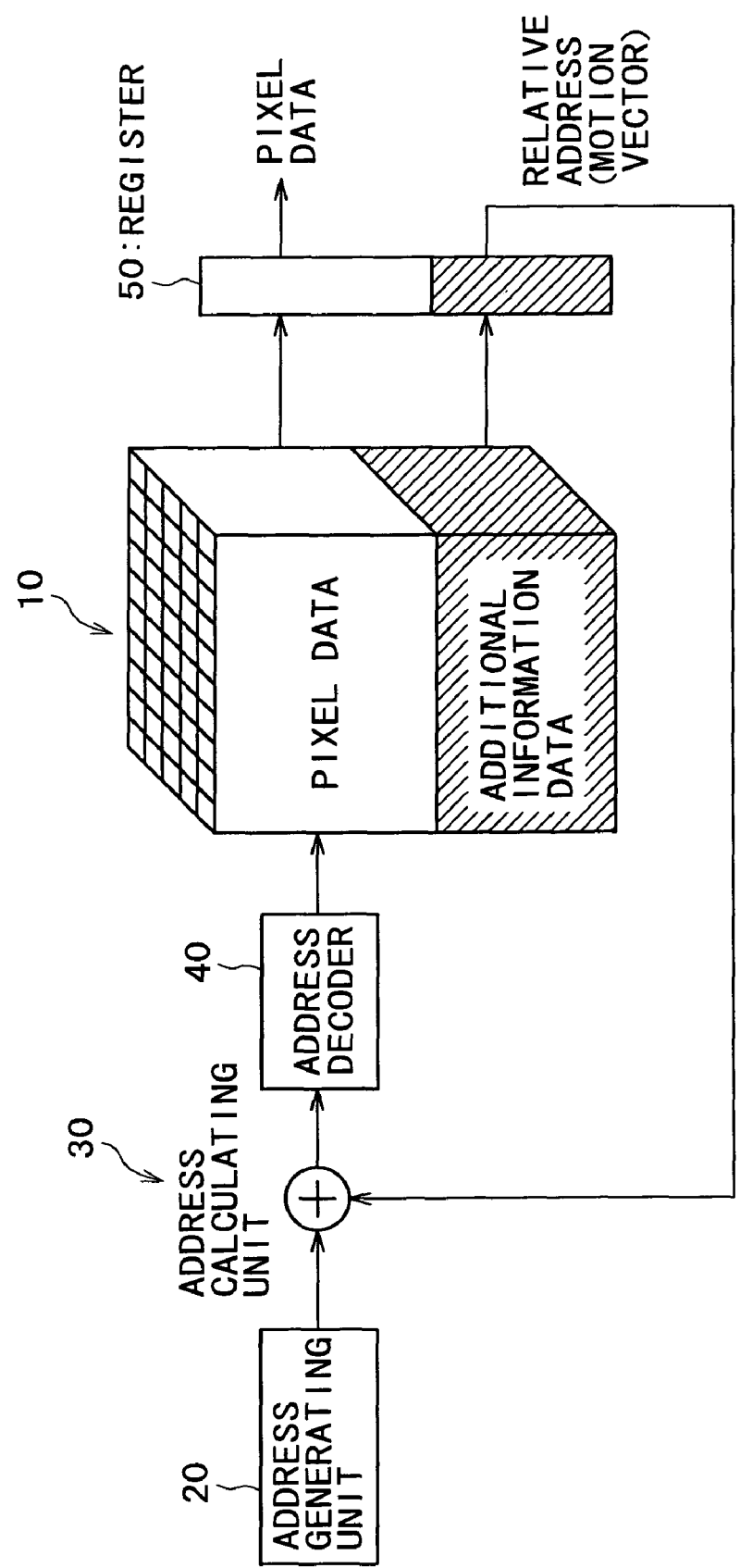
FIG. 2 is a conceptual diagram showing a first embodiment of an image data processing apparatus of the present invention.

FIG. 2 is a conceptual view showing a first embodiment of the image data processing apparatus according to the present invention.

As shown in the figure, an image data processing apparatus in this embodiment includes a memory cell array 10, an address generating unit 20, an address calculating unit 30, an address decoder 40, and a register 50.

The memory cell array 10 stores pieces of composite data each containing a piece of pixel data and additional information data associated with the pixel data. According to the image data processing apparatus according to this embodiment, each piece of composite data containing pixel data and additional information data associated with the pixel data are handled as one access unit. Specifically, each piece of the composite data of a specific number of bits is collectively written or read in or from the memory cell array 10.

The memory cell array 10 stores pieces of pixel data of pixels on an image of a specific unit, for example, one frame or a plurality of frames and additional information data associated with each of the pieces of the pixel data. According to the image data processing apparatus in this embodiment, the additional information data is represented by motion vector data indicating a motion vector (hereinafter, referred to simply as "motion vector").

The image data processing apparatus in this embodiment makes use of additional information data associated with each pieces of pixel data for determining a search region used for motion estimation of an image. Specifically, a search region for motion estimation of an image is predicted and set up by using a motion vector obtained by past processing. This is effective to reduce the search region. As a result, it is possible to reduce the processing load for estimation of the motion vector, and hence to realize high-speed processing. To be more specific, by predicting a search region in response to the motion of an image on the basis of the result of past motion estimation and suitably setting up the search region, it is possible to perform motion estimation in a small search region equivalent to a large search region having been generally used for motion estimation, and hence to improve the estimation accuracy while enhancing the efficiency and operational speed of the motion estimation.

Figure 3:
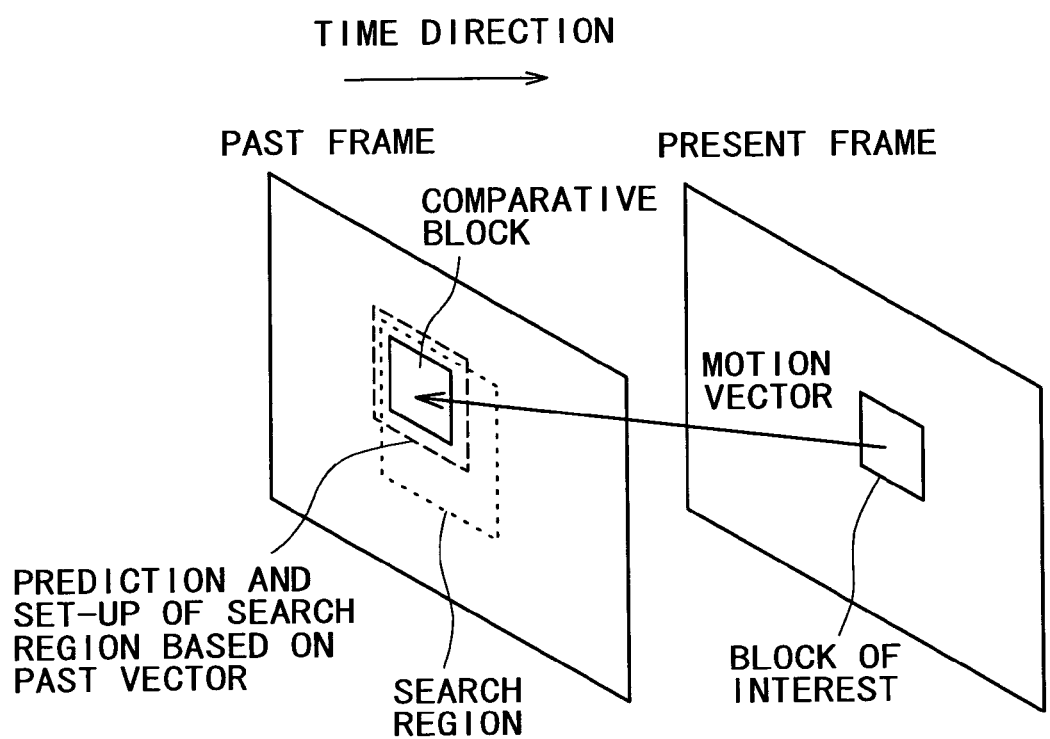
FIG. 3 is a diagram showing motion estimation of an image signal by a block matching process.

FIG. 3 is a conceptual diagram showing the conception of the above-described motion estimation in this embodiment.

Motion estimation is performed for image data inputted on a frame unit. As shown in the figure, in two frames temporally offset from each other, that is, a present frame and a past frame, a position of a block in the past frame, which block is closest to a block of interest in the present frame, is sought. As a result, it is possible to estimate the movement state of the block of interest between the continuous frames, and hence to obtain a motion vector indicating such a movement state of the block of interest.

In this case, as shown in FIG. 3, to seek a position of a block in the past frame, which block corresponds to a block of interest in the present frame, a searching process called "block matching process" is generally used. The block matching process is performed as follows. In a search region previously designated in a past frame, a comparative block having the same size as that of a block of interest is set, and a difference between the block of interest and the comparative block is obtained for each pixel. The total of the absolute values of the differences between the two blocks for all of the pixels is calculated. In the search region, the comparison between the comparative block and the block of interest is performed for each pixel while the position of the comparative block is shifted for each pixel in the vertical and horizontal directions. After the comparison is completed over the entire search region, a motion vector of the block of interest in the present frame is calculated on the basis of a position in the past frame at which the totals of the absolute values of the differences between the comparative block and the block of interest become smallest.

Since the block matching process is performed over the entire search region, the data processing amount of block matching is large. Accordingly, in the case of performing motion estimation at a high-speed, it is required to use a signal processor having both high operational speed and calculation ability.

The movement of a mobile object (hereinafter, referred to as "object") in an image may be regarded as being somewhat continuous in a short-period of time, and accordingly, the movement of an object of interest can be estimated on the basis of the previously estimated movement thereof. A search region for an object can be thus somewhat reduced by performing the present motion estimation of the object with reference to the previously estimated motion vector thereof. As shown in FIG. 3, a new search region for a block of interest can be predicted and set up on the basis of the previously estimated motion vector of the block. By performing block matching for the new search region thus obtained, it is possible to perform motion estimation in the new search region smaller than that used for general block matching, and hence to reduce a processing load required for motion estimation. This is advantageous in efficiently performing motion estimation.

Figure 4:
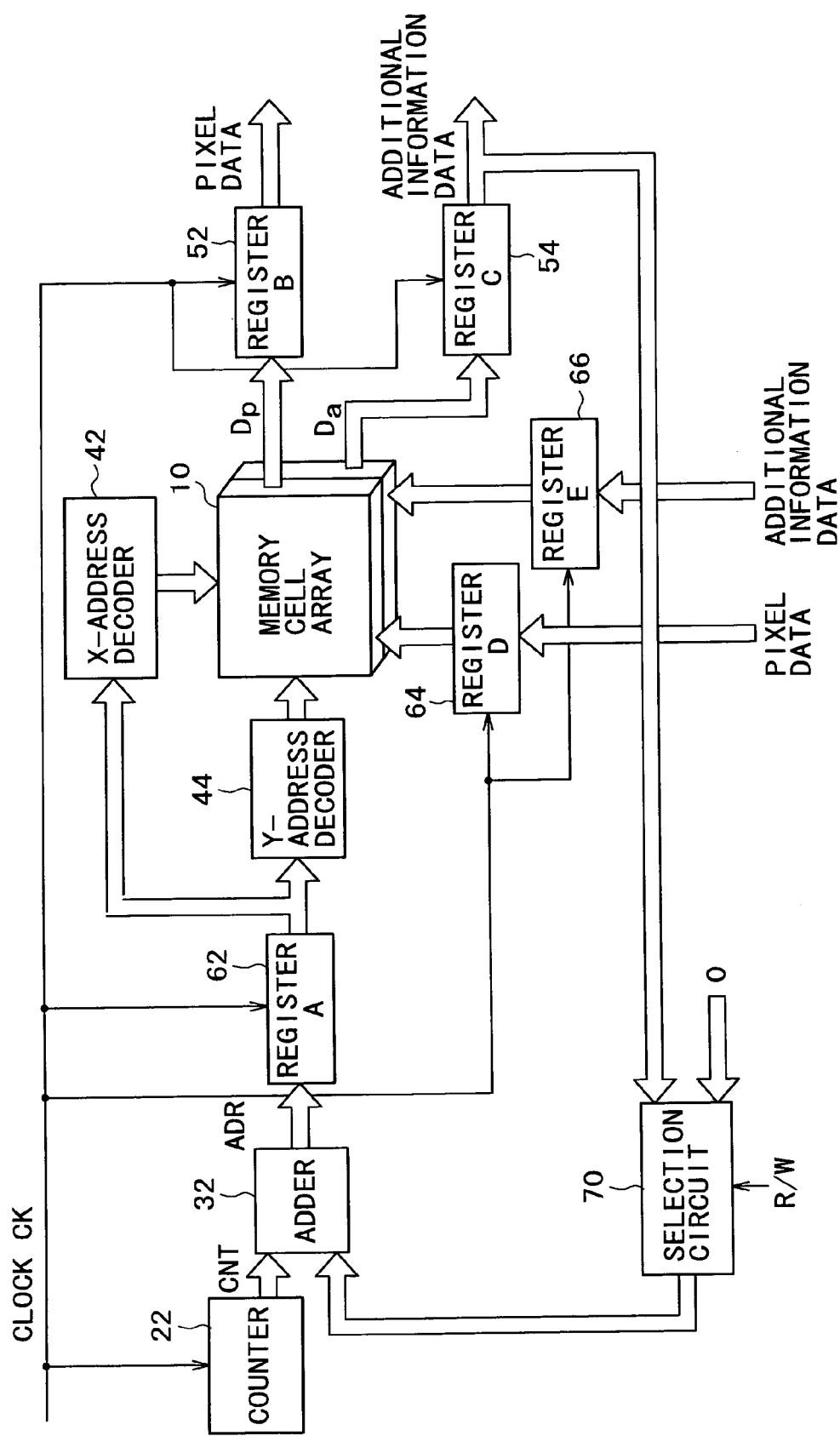
FIG. 4 is a block diagram showing one configuration example of the first embodiment of the image data processing apparatus.

FIG. 4 is a block diagram showing one configuration example of the image data processing apparatus for realizing the motion estimation process according to this embodiment.

An image data processing apparatus in this example shown in FIG. 4 includes a memory cell array 10, a counter 22, an adder 32, an X-address decoder 42, a Y-address decoder 44, registers 52 and 54, registers 62, 64 and 66, and a selection circuit 70.

The components of the image data processing apparatus in this example will be described below.

The memory cell array 10 stores pieces of composite data each containing a piece of pixel data and additional information data associated with the pixel data, nearly like the memory cell array shown in the conceptual diagram of FIG. 2 according to this embodiment.

In the memory cell array 10, on the basis of a designated address, a piece of composite data of a plurality of bits containing a piece of pixel data and additional information data is written or read in or from a memory region of the same number as that of bits of the composite data. For example, upon reading operation, on the basis of a designated address, a piece of composite data containing a piece of pixel data of x-bits (X is an integer, x>0) and additional information data of y-bits (y is an integer, y>0) associated with the pixel data is read from the memory cell array 10. In this way, the designation of one address allows access to a piece of the composite data of the x-bits and y-bits in total.

The counter 22 updates a counter value CNT on the basis of a clock signal CK supplied from external, and supplies the counter value CNT to the adder 32.

The adder 32 adds a signal selected by the selection circuit 70 to the counter value CNT, and supplies the added result as an address ADR to the register A (register 62).

The register 62 supplies the address ADR obtained from the adder 32 to the X-address decoder 42 and the Y-address decoder 44.

The X-address decoder 42 selects columns in the memory cell array 10 in accordance with higher m-bits of the address ADR held in the register 62.

The Y-address decoder 44 selects rows in the memory cell array 10 in accordance with lower n-bits of the address ADR held in the register 62.

In the memory cell array 10, a piece of pixel data $D_p$ and additional information data $D_a$ associated with the pixel data $D_p$ are read from memory cells selected by the X-address decoder 42 and the Y-address decoder 44. The pixel data $D_p$ is outputted to the register B (register 52), and the additional information data $D_a$ is outputted to the register C (register 54).

The register 52 holds the pixel data $D_p$ read from the memory cell array 10 and outputs the pixel data $D_p$ to an external destination.

The register 54 holds the additional information data $D_a$ read from the memory cell array 10 and outputs the additional information data $D_a$ to an external destination.

The register 64 holds each piece of pixel data associated with the pixel data, which is externally inputted and supplies the pixel data held therein to the memory cell array 10.

The register 66 holds additional information data, which is externally inputted, and supplies the additional information data to the memory cell array 10.

The pixel data outputted from the register 64 and the additional information data outputted from the register 66 form a piece of composite data. In this way, according to the image data processing apparatus in this example, the registers 64 and 66 constitute a feature of a composite data forming means.

The selection circuit 70 selects either the additional information data read from the register 54 or data "0", and supplies the selected data to the adder 32.

As shown in FIG. 4, depending on whether an input signal is a read-out signal (R) or a write-in signal (W), the selection circuit 70 selects input data and supplies the input data to the adder 32. Upon reading operation, the selection circuit 70 selects the additional information data and supplies the additional information data to the adder 32, and upon writing operation, the selection circuit 70 selects the data "0", and supplies the data "0" to the adder 32.

The operation of the image data processing apparatus having the above-described configuration in this example will be described below.

According to the image data processing apparatus in this example, the memory cell array 10 stored pieces of composite data each containing a piece of pixel data and additional information data associated with the pixel data. In this example, the additional information data is represented by a motion vector obtained by motion estimation based on the past image data.

Upon writing operation, since the data "0" is selected by the selection circuit 70, the counter value CNT outputted from the counter 22 is supplied as the address ADR to the register 62. In this case, on the basis of the counter value CNT, memory cells are sequentially selected in the memory cell array 10, and a piece of composite data containing a piece of pixel data and additional information data inputted from external is written in the selected memory cells.

Upon execution of a reading operation, additional information data read from the memory cell array 10 is selected by the selection circuit 70 and is added to the adder 32. The adder 32 adds the additional information data to the counter value CNT generated from the counter 22, and supplies the added result as the address ADR to the X-address decoder 42 and the Y-address decoder 44.

In the image data processing apparatus in this example, upon reading operation, a piece of pixel data and additional information data associated with the pixel data are read from the memory cell array 10 on the basis of a designated address, and the additional information data is supplied to the adder 32 via the selection circuit 70. Accordingly, the additional information data, that is, the previously estimated motion vector is added to the count value CNT generated from the counter 22. As a result, a new search region for motion estimation is set up, and in the new search region, the motion estimation is performed, for example, by the block matching process, to obtain a motion vector of an image block of interest.

In this way, according to the image data processing apparatus in this example, by setting up a new search region on the basis of the previously estimated motion vector, and performing motion estimation by block matching in the new search region, it is possible to perform the motion estimation in the new search region smaller than that used for general block matching process, and hence to reduce a processing load required for motion estimation. This is advantageous in efficiently performing the motion estimation.

Second Embodiment

Figure 5:
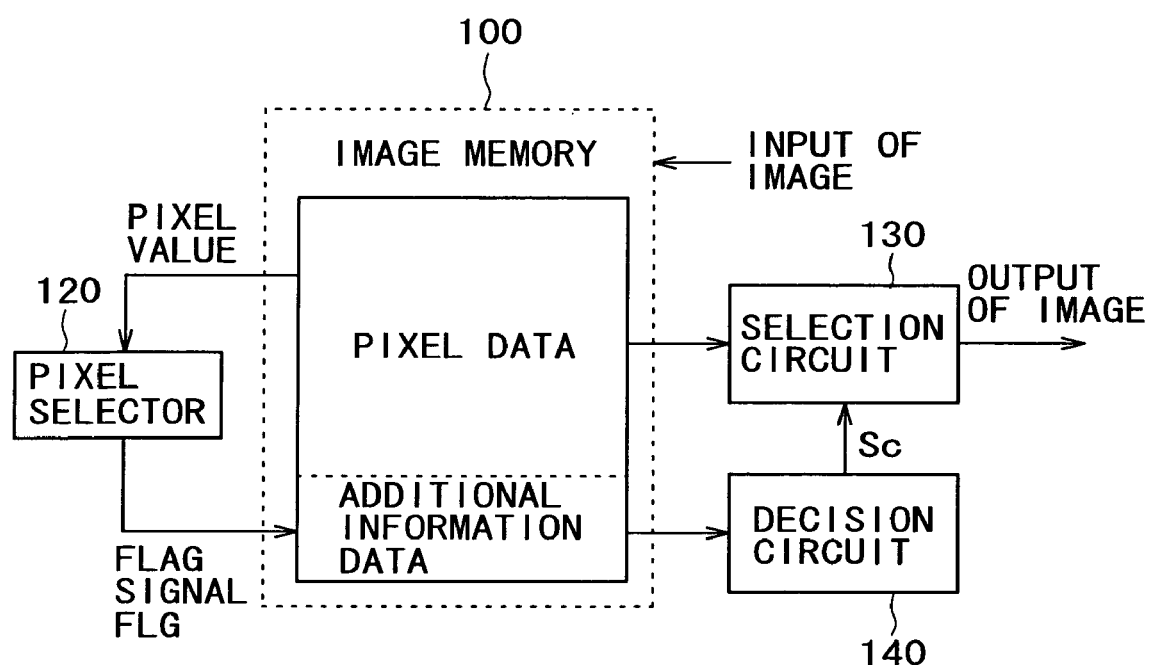
FIG. 5 is a block diagram showing a second embodiment of the image data processing apparatus of the present invention.

FIG. 5 is a configuration diagram showing a second embodiment of the image data processing apparatus of the present invention.

As shown in the figure, an image data processing apparatus in this embodiment includes an image memory 100, a pixel selector 120, a selection circuit 130, and a decision circuit 140.

The components of the image data processing apparatus in this embodiment will be described below.

The image memory 100 stores pieces of composite data each containing a piece of pixel data and additional information data. According to the image data processing apparatus in this embodiment, additional information data associated with pixel data is represented by flag data used for forming images in a plurality of hierarchies having different resolutions, wherein the flag data indicates each piece of pixel data contained in the higher hierarchy among pieces of pixel data contained in a lower hierarchy.

The pixel selector 120 generates flag data FLG as additional information data for each piece of pixel data stored in the image memory 100. The flag data FLG is associated with a piece of pixel data as additional information data, to generate a piece of composite data, which is then stored in the image memory 100.

The decision circuit 140 generates a selection control signal $S_c$ on the basis of the additional information data contained in the composite data read from the image memory 100, and supplies the selection control signal $S_c$ to the selection circuit 130.

The selection circuit 130 selectively reads a piece of pixel data from the image memory 100 on the basis of the selection control signal $S_c$ supplied from the decision circuit 140, and outputs the pixel data.

The operation of the image data processing apparatus in this embodiment will be described below.

As described above, according to the image data processing apparatus in this embodiment, the image memory 100 stores pieces of composite data each containing a piece of pixel data and additional information data associated with the pixel data.

In this embodiment, the additional information data is represented by flag data used for forming a piece of image data having different resolutions, wherein the flag data indicates a piece of pixel data forming an image in a higher hierarchy having a low resolution among pieces of pixel data in the lower hierarchy having a high resolution.

FIG. 6 is a conceptual diagram showing pieces of pixel data of pixels forming images in a higher hierarchy and a lower hierarchy. As shown in the figure, for example, one piece of the pixel data of a pixel placed in the higher hierarchy is associated with four pieces of the pixel data of four pixels placed in the lower hierarchy. To be more specific, for each group consisting of the four pixels contained in the image in the lower hierarchy, one pixel is selected as a pixel forming part of the image in the higher hierarchy. As a result, images having different resolutions can be represented by using pieces of the pixel data in the upper and lower hierarchies.

According to the image data processing apparatus in this embodiment, pieces of pixel data in the higher hierarchy and pieces of pixel data in the lower hierarchy are not separately stored but are simultaneously stored in the image memory 100 as shown in FIG. 5. To realize such simultaneous storage of pieces of pixel data in the higher and lower hierarchies, additional information data, that is, flag data FLG is added to a piece of pixel data in the lower hierarchy. The image memory 100 stores pieces of composite data each containing a piece of pixel data in the lower hierarchy and the flag data FLG associated with the pixel data.

The generation of additional information data will be described below.

Additional information data is generated by the pixel selector 120 shown in FIG. 5. For each group consisting of four pieces of the pixel data of pixels in the lower hierarchy stored in the image memory 100, a piece of the pixel data of one pixel is selected by the pixel selector 120, and the flag data FLG indicating the selected pixel data is generated by the pixel generator 120. The flag data FLG generated by the pixel selector 120 is added as additional information data to the pixel data, to generate a piece of composite data, which is then stored in the image memory 100.

The selection of a piece of pixel data of a pixel by the pixel selector 120 is performed in accordance with a predetermined selection method. Examples of the selection methods include a method of selecting a piece of pixel data of a most frequent pixel, a method of selecting a piece of pixel data of a center (median) pixel, and a method of selecting a piece of pixel data of a pixel closest to an average value.

The most frequent pixel is determined as a pixel having the highest frequency of appearance among the four pieces. The center pixel is determined as a result of subjecting the pieces of pixel data of the four pixels to specific filtering, for example, using a median filter, and selecting a piece of pixel data closest to the central value obtained by the filtering process.

The average value is determined by averaging the piece of pixel data of the four pixels.

In the image selector 120, for each group consisting of pieces of pixel data of four pixels, a piece of pixel data of one pixel is selected as a piece of pixel data of a pixel forming part of an image in the higher hierarchy by either of the above-described selection methods, and the flag data FLG indicating the selected pixel data is generated. The flag data FLG has one bit for example, which is hereinafter sometimes referred to as "additional information bit". For the pieces of pixel data of the four pixels in the lower hierarchy, for example, an additional information bit "1" is added to a piece of pixel data of one pixel selected as the pixel data in the higher hierarchy, and an additional information bit "0" is added to each of pieces of pixel data of the remaining three pixels.

According to the image processing apparatus in this embodiment, when pieces of pixel data are inputted in the pixel selector 120, one piece of pixel data is selected from each group consisting of four pieces of pixel data in accordance with the predetermined selection method and is taken as a piece of pixel data forming part of an image in the higher hierarchy. The additional information bit "1" is added to the selected pixel data, and the additional information bit "0" is added to each of the remaining three pieces of pixel data.

In this way, an additional information bit is generated for each piece of the inputted pixel data by the pixel selector 120, and the additional information bit is added to the corresponding pixel data, to generate a piece of composite data, which is then stored in the image memory 100.

In the case of reading a piece of pixel data from the image memory 100, the pixel data and the additional information bit associated with the pixel data are simultaneously read from the pixel memory 100. The additional information bit is outputted to the decision circuit 140. The decision circuit 140 decides whether or not the pixel data is a piece of pixel data in the higher hierarchy on the basis of the additional information bit, and outputs the decided result (selection control signal) to the selection circuit 130. The operation of reading a piece of pixel data will be described below.

In the case of supplying a request for a piece of pixel data in the lower hierarchy to the selection circuit 130, the selection circuit 130 does not perform selection of pixel data. In this case, the selection circuit 130 picks up a piece of pixel data in the lower hierarchy contained in a piece of composite data read from the image memory 100 and outputs the pixel data to external.

On the other hand, in the case of supplying a request for a piece of pixel data in the higher hierarchy to the selection circuit 130, the selection circuit 130 selects a piece of pixel data in the higher hierarchy on the basis of a piece of composite data read from the image memory 100.

The additional information bit contained in a piece of composite data read from the image memory 100 is outputted to the decision circuit 140. The decision circuit 140 generates a selection control signal $S_c$ on the basis of a value of the additional information bit, and outputs the selection control signal $S_c$ to the selection circuit 130. For example, when the additional information bit is set to "0", the selection control signal $S_c$ is kept at a low level, whereas when the additional information bit is set to "1", the selection control signal $S_c$ is kept at a high level. Accordingly, the selection circuit 130 selects a piece of pixel data read from the pixel data storing unit 110 on the basis of the selection control signal $S_c$ inputted from the decision circuit 140 and outputs the selected pixel data to external. To be more specific, when the selection control signal $S_c$ is kept at the high level, the selection circuit 130 selects the pixel data and outputs the selected pixel data, whereas when the selection control signal $S_c$ is kept at the low level, the selection circuit 130 deletes the pixel data.

According to the image data processing apparatus in this embodiment, a piece of pixel data in the higher hierarchy can be thus selected and outputted on the basis of the additional information bit by the decision circuit 140 and the selection circuit 130. Accordingly, by storing pieces of pixel data in the lower hierarchy and additional information data associated with the pixel data, it is possible to store pieces of pixel data in both the lower and higher hierarchies having different resolutions.

FIG. 7 is a conceptual diagram showing a piece of pixel data and additional information data stored in the image memory 100 according to this embodiment. As shown in the figure, a piece of pixel data is composed of a plurality of bits, thereby representing an image in the lower hierarchy. Additional information data is added to a piece of pixel data in such a manner as to be associated with the pixel data. In this embodiment, the additional information data is defined as one-bit data; however, according to the present invention, the number of bits is not limited thereto. The increasing number of bits is advantageous in that the amount of additional information is increased, although the volume of the image memory becomes large. For example, two or more hierarchies can be represented by further increasing the number of bits of additional information, with a result that pieces of pixel data in two or more hierarchies having different resolutions can be stored in one image memory.

In the pixel data having the hierarchy structure shown in FIG. 7, the number of pixels in the higher hierarchy is one-fourth of the number of pixels in the lower hierarchy. According to the image data processing apparatus of the present invention, the ratio of the number of pixels in the higher hierarchy to the number of pixels in the lower hierarchy is not limited to one-fourth but may be any other value. FIGS. 8(a) to 8(d) show some examples of relationships between the higher hierarchy and the lower hierarchy.

Figure 8A:
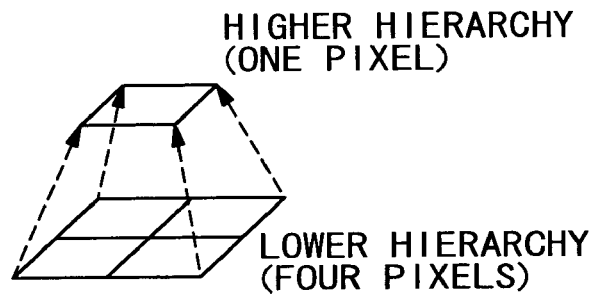
FIGS. 8A to 8D are diagrams showing examples of pieces of pixel data in a higher hierarchy and a lower hierarchy, wherein the examples are different from each other in terms of ratio between resolutions of images in the higher and lower hierarchies.
Figure 8B:
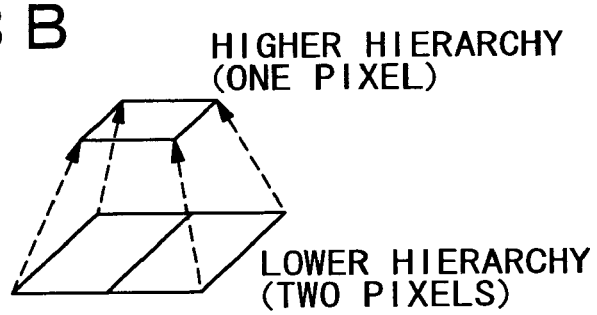
Figure 8C:
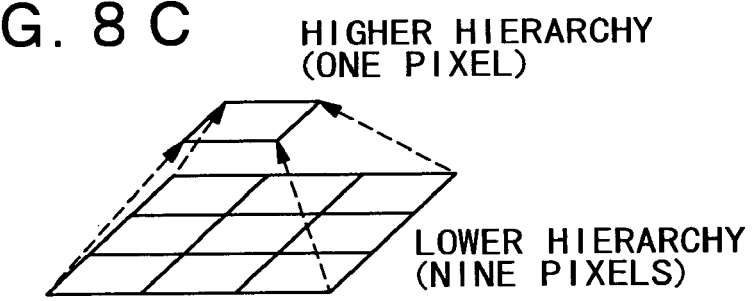
Figure 8D:
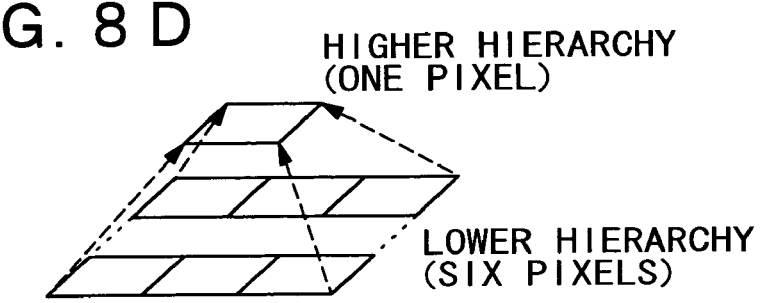

In the example shown in FIG. 8A, like the example shown in FIG. 6, one pixel in the higher hierarchy is selected for each group consisting of four pixels in the lower hierarchy. In the example shown in FIG. 8B, one pixel in the higher hierarchy is selected for each group consisting of two pixels in the lower hierarchy. In the example shown in FIG. 8C, one pixel in the higher hierarchy is selected for each group consisting of nine pixels in the lower hierarchy. In the example shown in FIG. 8D, one pixel in the higher hierarchy is selected for each group consisting of six pixels in the lower hierarchy.

FIG. 9 shows another configuration example of the image data processing apparatus in this embodiment.

Components of the image data processing apparatus in this embodiment have configurations being substantially the same as those of the image data processing apparatus shown in FIG. 5, except for a pixel selector 120a. As shown in FIG. 9, the pixel selector 120a in this embodiment selects a piece of pixel data on the basis of a pixel related signal $S_d$ inputted from external and generates flag data FLG or another additional information data associated with the pixel data. The pixel selector 120a adds the flag data FLG or another additional information data to the pixel data, to generate a piece of composite data. The composite data is stored in the image memory 100.

The pixel selector 120a selects a pixel in the higher hierarchy on the basis of the pixel related signal $S_d$ inputted from external. Here, in the case of selecting a pixel in the higher hierarchy, a pixel in the higher hierarchy is selected from each group consisting of a specific number of pixels on the basis of a resolution designated by the pixel related signal $S_d$.

Accordingly, it is possible to control the resolution of an image in the higher hierarchy on the basis of the pixel related signal $S_d$. To be more specific, a ratio of the number of pixels in the higher hierarchy to the number of pixels in the lower hierarchy can be freely set, although in the example shown in FIG. 8, one pixel in the higher hierarchy is selected from each group consisting of four pixels in the lower hierarchy.

As described above, in the configuration example of the image data processing apparatus shown in FIG. 9, in the case where the pixel selector 120a selects a pixel in the higher hierarchy, the resolution of the higher hierarchy is set up on the basis of the pixel related signal $S_d$ inputted from external, and on the basis of the resolution, a pixel in the higher hierarchy is selected from each group consisting of a specific number of pixels in the lower hierarchy.

In the above description, the pixel related signal $S_d$ is used to control the resolution in the higher hierarchy; however, according to the image data processing apparatus in this embodiment, the pixel related signal $S_d$ may be used to control the manner of selecting a pixel in the higher hierarchy. To be more specific, the pixel selector 120a may select a pixel in the higher hierarchy not only by the above described method of selecting the pixel in the higher hierarchy as a most frequent pixel, center pixel, or average pixel but also by a method of selecting the pixel in the higher hierarchy on the basis of the designated pixel related signal $S_d$.

As described, according to this embodiment, each piece of composite data containing a piece of pixel data and additional information data associated with the pixel data is stored in the image memory 100. In this case, the pixel data is that placed in the lower hierarchy, and the additional information data is flag data FLG indicating a piece of pixel data in the higher hierarchy having a resolution different from that of the lower hierarchy. A pixel in the higher hierarchy is selected from each group consisting of a specific number of pixels in the lower hierarchy by a specific selection method, and the flag data FLG indicating a pixel in the higher hierarchy is given to the selected pixel. The flag data FLG is written, together with the pixel data of the selected pixel, in the image memory 100. Upon reading a piece of pixel data in the higher hierarchy, a pixel in the higher hierarchy is selected from each group consisting of the specific number of pixels in the lower hierarchy on the basis of the flag data FLG, and the pixel data of the pixel is outputted. Accordingly, it is possible to store pieces of pixel data in a plurality of hierarchies having different resolutions without significantly increasing the volume of the image memory.

Third Embodiment

Figure 10:
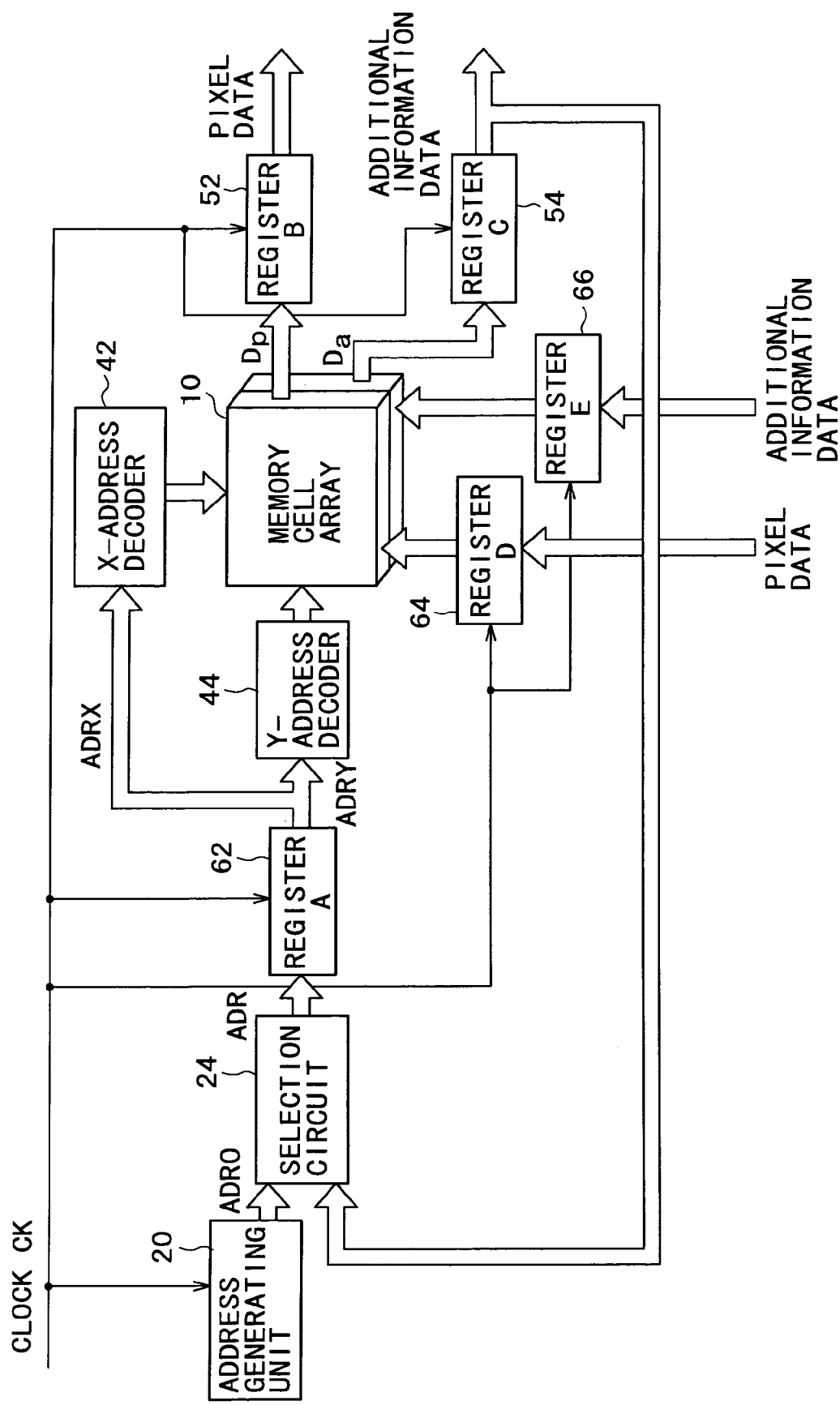
FIG. 10 is a block diagram showing a third embodiment of the image data processing apparatus.

FIG. 10 is a configuration diagram showing a third embodiment of the image data processing apparatus of the present invention.

As shown in the figure, an image data processing apparatus according to this embodiment includes a memory cell array 10, an address generating unit 20, a selection circuit 24, an X-address decoder 42, a Y-address decoder 44, registers 52 and 54, and registers 62, 64, and 66.

According to the image data processing apparatus in this embodiment, additional information data associated with a piece of pixel data is represented by a read-out address for reading a piece of the next pixel data. To be more specific, in the case of reading a piece of pixel data from the memory cell array 10, a specific address is designated, and a piece of composite data is read out on the basis of the specific address. In this case, additional information data contained in the composite data indicates an address for reading a piece of the next composite data. Accordingly, by supplying the additional information data as an address to the X-address decoder and the Y-address decoder, the next composite data designated by the address can be read out. As a result, for example, pieces of pixel data of all pixels forming one object can be sequentially read out. This is advantageous in simply realizing address control.

The image data processing apparatus in this embodiment has a configuration being substantially the same as that of the image data processing apparatus shown in FIG. 4, except for the address generating unit 20 and the selection circuit 24, and therefore, the image display apparatus in this embodiment will be described below with a focus on the address generating unit 20 and the selection circuit 24.

The address generating unit 20 generates an address for reading a piece of pixel data, and supplies the address to the register 62 via the selection circuit 24. The address held in the register 62 contains an X-address ADRX, that is, a column address and a Y-address, that is, a row address. The X-address ADRX is inputted in the X-address decoder 42 and the Y-address ADRY is inputted in the Y-address decoder 44. A piece of composed data is read from memory cells designated by the column address and the row address.

A piece of pixel data contained in the composite data read from the memory cells is held in the register 52 and is outputted to external. Meanwhile, additional information data contained in the composite data is held in the register 54 and is outputted to the selection circuit 24.

The selection circuit 24 selects either an address ADR0 generated by the address generating unit 20 or the additional information data inputted from the register 54, and outputs the selected address ADR to the register 62.

As described above, according to the image data processing apparatus in this embodiment, the additional information data indicates an address for reading a piece of the next pixel data. To be more specific, by taking the additional information data as an address ADR and supplying the address ADR to the X-address decoder 42 and the Y-address decoder 44, a piece of the desired next pixel data can be read out on the basis of the designated address ADR. For example, in the case of reading pieces of data of a plurality of pixels forming one object, by designating an address of a memory region, at which a piece of pixel data of the next pixel is to be stored, of the memory cell array 10 to each piece of pixel data as the additional information data, the pieces of data of all the pixels forming the object can be subsequently read out. With this configuration, it is also possible to easily realize address designation.

The operation of the image data processing apparatus having the above-described configuration in this embodiment will be described below.

The selection circuit 24 selects an address ADR0 generated by the address generating unit 20, and outputs the address ADR0 to the register 62.

The address inputted from the selection circuit 24 is held in the register 62, and outputs a row address ADRY and a column address ADRX contained in the address to the Y-address decoder 44 and the X-address decoder 42, respectively.

The X-address decoder 42 and the Y-address decoder 44 designate specific memory cells in the memory cell array 10 on the basis of the column address ADRX and the row address ADRY inputted therein.

In the memory cell array 10, a piece of composite data stored in memory cells designated by the X-address decoder 42 and the Y-address decoder 44 are read therefrom. Like the previous embodiments, according to this embodiment, access to data in the memory cell array 10 is performed on a unit of a piece of composite data.

Of the composite data read from the memory cell array 10, a piece of pixel data is held in the register 52 and additional information data is held in the register 54. The pixel data held in the register 52 is outputted to external, and the additional information data held in the register 54 is outputted to external and is also outputted to the selection circuit 24.

Upon the next reading operation, the additional information data inputted from the register 54 is selected by the selection circuit 24. The additional information data is inputted in the register 62, and the column address ADRY and the row address ADRX contained in the additional information data are inputted in the Y-address decoder 44 and the X-address decoder 42, respectively, whereby desired memory cells are selected in the memory cell array 10 on the basis of these addresses.

As described above, for example, in the case of reading pieces of image data of all pixels contained in a desired object, an initial address of a predetermined initial pixel is first generated by the address generating unit 20. A piece of composite data containing a piece of pixel data of the initial pixel is then read out on the basis of the initial address. The next read-out address is designated by additional information data contained in the composite data. Accordingly, pieces of composite data containing pieces of pixel data of all the pixels in the object can be sequentially read out. With such read-out control, since the address can be designated by the address generating unit 20 for generating an initial address and the selection circuit 24, the control of the read-out address can be realized with a simple circuit configuration.

Fourth Embodiment

Figure 11:
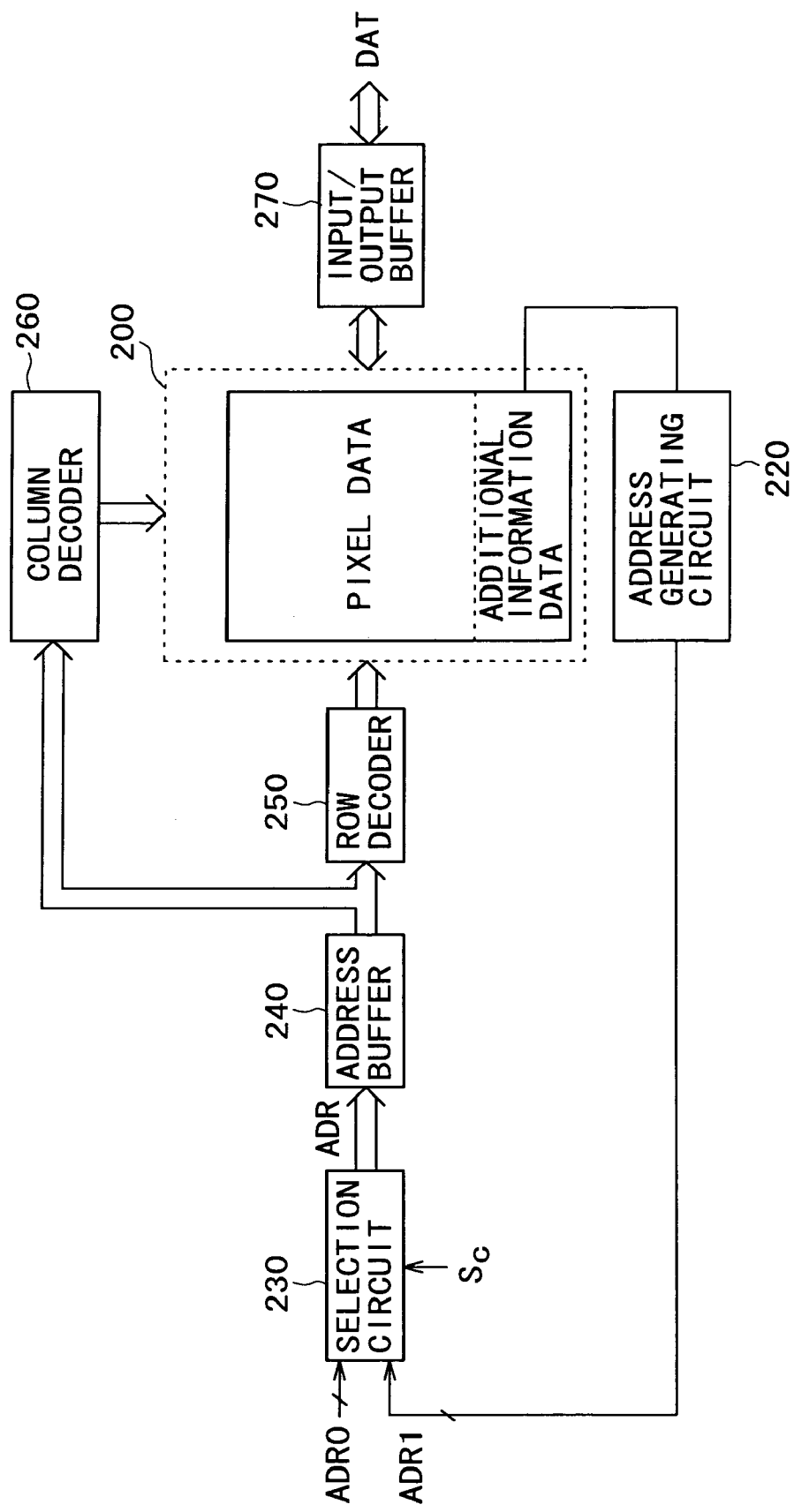
FIG. 11 is a block diagram showing a fourth embodiment of the image data processing apparatus of the present invention.

FIG. 11 is a configuration diagram showing a fourth embodiment of the image data processing apparatus of the present invention.

As shown in the figure, an image data processing apparatus in this embodiment includes an image memory 200, an address generating circuit 220, a selection circuit 230, an address buffer 240, a row decoder 250, a column decoder 260, and an input/output buffer 270.

The components of the image data processing apparatus in this embodiment will be described below.

The image memory 200 stores pieces of composite data each containing a piece of pixel data and additional information data associated with the pixel data. Like the memory cell array in each of the previous embodiments of the present invention, according to the image memory 200 in this embodiment, access to data is performed on a unit of a piece of the composite data.

In the image memory 200, on the basis of an inputted address, memory cells designated by the address are selected, and a piece of composite data containing a piece of pixel data and additional information data associated with the pixel data is written or read in or from the selected memory cells.

According to the image data processing apparatus in this embodiment, additional information data associated with a piece of pixel data is represented by information on scanning direction indicating a scanning direction of a piece of the next pixel data to be read. The operation of reading a piece of pixel data on the basis of information on scanning direction associated with a piece of the previous pixel data will be described in detail later.

The address generating circuit 220 generates an address ADR1 used for reading a piece of the next composite information on the basis of additional information data, that is, information on scanning direction contained in a piece of the previous composite data read from the image memory 200, and supplies the address ADR1 to the selection circuit 230.

The generation of the address ADR1 on the basis of the information on scanning direction will be described in detail later.

The selection circuit 230 selects either an address ADR0 supplied from external or the address ADR1 generated by the address generating circuit 220 on the basis of the selection control signal $S_c$, and outputs the selected address ADR to the address buffer 240.

The address buffer 240 holds the address ADR selected by the selection circuit 230 and outputs the address ADR to the row decoder 250 and the column decoder 260.

The row decoder 250 and the column decoder 260 select, on the basis of the address inputted from the address buffer 240, memory cells designated by the address in the image memory 200.

The input/output buffer 270 holds write-in data or read-out data. Upon writing operation, the write-in data held by the input/output buffer 270 is written in memory cells selected by the row decoder 250 and the column decoder 260. Upon reading operation, the read-out data read from memory cells selected by the row decoder 250 and the column decoder 260 is held in the input/output buffer 270 and is outputted externally.

The operation of the image data processing apparatus in this embodiment will be described below.

The image data processing apparatus in this embodiment reads a piece of composite data from the image memory 200 under either an ordinary operation mode or a starting point designating mode.

Under the ordinary operation mode, an address ADR0 inputted from external is selected by the selection circuit 230 and inputted in the address buffer 240. The row decoder 250 and the column decoder 260 select, on the basis of the address supplied from the address buffer 240, memory cells designated by the address in the image memory 200. Accordingly, under the ordinary operation mode, data is written or read in or from the memory cells designated by the address ADR0 supplied from external.

Under the starting point designating mode, an address ADR0, which corresponds to, for example, one starting pixel (starting point of reading operation), is designated. A piece of composite data containing a piece of pixel data of the starting pixel and additional information data associated with the pixel data is read from the image memory 200. The additional information data contained in the composite data thus read out is inputted in the address generating circuit 220, and the next address ADR1 for the next reading operation is generated on the basis of the additional information data by the address generating circuit 220. Upon second reading operation, the address ADR1 generated by the address generating circuit 220 is selected by the selection circuit 230, and memory cells designated by the address ADR1 are selected by the row decoder 250 and the column decoder 260, whereby a piece of composite data containing a piece of pixel data and additional information data is read from the selected memory cells.

In this way, under the starting point designating mode, pieces of pixel data of all pixels in a specific image region can be read out only by an initial step of designating an address of a starting pixel, which step is followed by a step of automatically generating the next read-out address on the basis of the additional information data, that is, the scanning information data associated with the starting pixel. In other words, pixel data of all pixels in a specific image data can be automatically read out only by one address designation. The starting point designating mode is, in particular, effective to read out pieces of pixel data of all pixels in a specific object contained in an image. In this case, a piece of composite data containing a piece of pixel data of the starting pixel and additional information data, that is, scanning information data is stored in the image memory 200, wherein the scanning information data is specified to designate an address of a pixel next to the starting pixel in such a manner as to scan all of the pixels sequentially from the starting pixel in the object. With this set-up, upon reading operation, the pieces of pixel data of all the pixels in the desired object can be sequentially read out only by an initial step of inputting an address ADR0 of the starting pixel to the selection circuit 230, which step is followed by a step of automatically generating the next read-out address on the basis of the additional information data, that is, the scanning information data contained in the composite data read from the image memory 200.

The additional information used for the image data processing apparatus in this embodiment will be described with reference to FIGS. 12 and 13.

Figure 12:
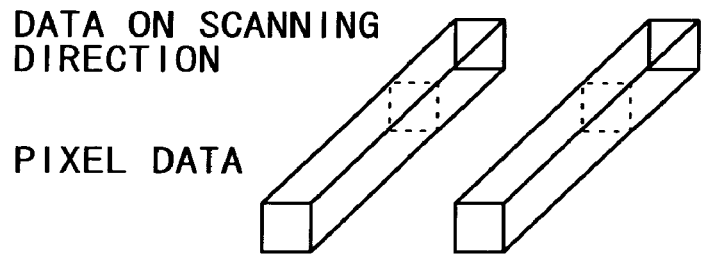
FIG. 12 is a conceptual diagram showing a piece of pixel data and information on scanning direction in the fourth embodiment of the image data processing apparatus.

FIG. 12 is a conceptual diagram showing one example of a piece of composite data containing a piece of pixel data and additional information data stored in the image memory 200 according to this embodiment. As shown in the figure, data on scanning direction as the additional information data is added to the piece of pixel data in such a manner as to be associated therewith. The image memory 200 stores pieces of the composite data each containing a piece of the pixel data and the data on scanning direction associated with the pixel data.

Figure 13:
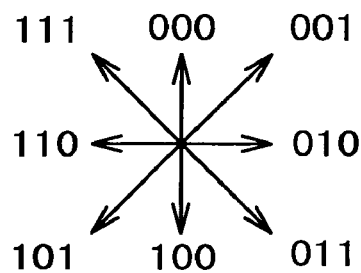
FIG. 13 is a diagram showing one example of data on scanning direction.

FIG. 13 shows one example of the data on scanning direction. In the example shown in the figure, the data on scanning direction represented by 3-bit data can contain eight scanning directions. The positional relationship between one pixel and a piece adjacent thereto is designated by the data on scanning direction.

The data on scanning direction shown in FIG. 13 is added to a piece of pixel data, to generate a piece of composite data. The composite data is stored in the image memory 200. Upon reading the composite data from the image memory 200, the position of a pixel as a target to be read out next time can be acquired on the basis of the data on scanning direction contained in the composite data. An address corresponding to a piece of pixel data of the next pixel can be calculated on the basis of the acquired position of the next pixel by the address generating circuit 220. On the basis of the calculated address, a piece of the next composite data is read from the image memory 200. Subsequently, on the basis of data on scanning direction contained in the next composite data thus read out, an address for reading a piece of composite data containing a piece of the further next pixel data can be calculated. In this way, on the basis of data on scanning direction contained in a piece of composite data read from the image memory 200, an address used for reading a piece of the next composite data can be calculated, with a result that pieces of pixel data of all pixels in a desired object can be sequentially read out.

In addition to the above-described calculation of an address for the next reading operation by using the data on scanning direction, the scanning direction of the data on scanning direction can be set to a specific direction by subjecting the data on scanning direction to a specific processing operation. For example, by reversing a higher one of three-bits of data indicating the scanning direction, the scanning direction can be reversed. Alternatively, by adding "001" to three-bits data on scanning direction, the scanning direction can be turned 45° clockwise, and by subtracting "001" from three-bit data on scanning direction, the scanning direction can be turned 45° counterclockwise.

The calculating operation of an address using data on scanning direction will be described by way of a specific embodiment. The calculating operation is performed by the address generating circuit 220 shown in FIG. 11.

Figure 14:
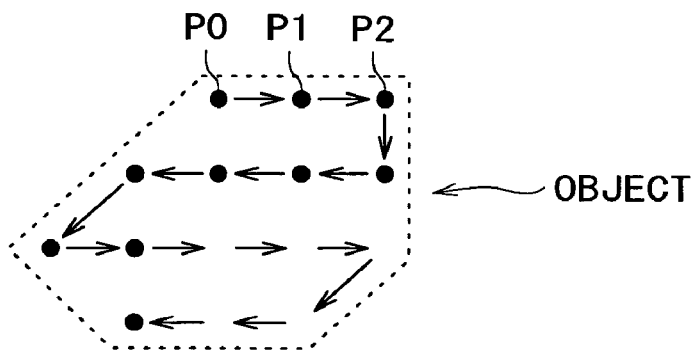
FIG. 14 is a diagram showing read-out pieces of pixel data from a desired object on the basis of data on scanning direction.

FIG. 14 shows an example how to designate pixels in an object having a specific shape in the case of reading pieces of pixel data of the pixels on the basis of data on scanning direction.

In the figure, a pixel P0 is set as a starting pixel. Upon reading operation, an address of the starting pixel P0 is initially inputted from external. On the basis of the address, a piece of pixel data of the starting pixel P0 and additional information data, that is, data on scanning direction associated with the pixel P0 are read out. An address of a pixel P1 as a target to be read out next time is generated on the basis of the data on scanning direction D0 associated with the pixel P0 by the address generating circuit 220, and on the basis of the address thus generated, a piece of pixel data of the pixel P1 and data on scanning direction D1 associated with the pixel P1 are read out. On the basis of the data on scanning direction D1 thus read out, an address D2 of a pixel P2 as a target to be read out next time is generated.

Here, all of pieces of pixel data of pixels on one screen are stored in the image memory 200 in the order of one to another of the continuous rows from an upper end of the screen. Each piece of the pixel data and additional information data associated with the pixel data form a piece of composite data. Addresses are given to the pieces of composite data in the order of increment of the addresses.

The address given to each piece of the composite data contains a row address and a column address. It is assumed that the row addresses increase in the order of one to another of the continuous rows in the direction from the upper end to the lower end of the screen, and the columns addresses increase in the order of one to another of the continuous columns in the direction of the left end to the right end of the screen.

It is also assumed that the data on scanning data shown in FIG. 13 corresponds to the actual movement direction on the screen. Accordingly, the data on scanning direction, which has the bits "010", indicates a pixel offset rightward from the pixel of interest on the screen, and the data on scanning direction, which has the bits "100", indicates a pixel offset downward from the pixel of interest.

Here, the present address is taken as $ADR_i$ and the next read-out address is taken as $ADR_{i+1}$, and the data on scanning direction contained in a piece of composite data read from memory cells designated by the present read-out address $ADR_i$ is taken as $D_i$.

The read-out address $ADR_i$ contains a row address $ADRY_i$ and a column address $ADRX_i$. That is, $ADR_i=(ADRY_i, ADRX_i)$. Similarly, the read-out address $ADR_{i+1}$ contains a row address $ADRY_{i+1}$ and a column address $ADRX_{i+1}$. That is, $ADR_{i+1}=(ADRY_{i+1}, ADRX_{i+1})$.

The calculation for obtaining the next read-out address $ADR_{i+1}$ from the present read-out address $ADR_i$ for each of pieces of data on scanning data $D_i(=000$ to $111)$ is performed in accordance with the following equations 1 to 8.

When $D_i=000$, $ADRY_{i+1}=ADRY_i-1$ $ADRX_{i+1}=ADRX_i$ [Equation 1]

When $D_i=001$, $ADRY_{i+1}=ADRY_i-1$ $ADRX_{i+1}=ADRX_i+1$ [Equation 2]

When $D_i=010$, $ADRY_{i+1}=ADRY_i$ $ADRX_{i+1}=ADRX_i+1$ [Equation 3]

When $D_i=011$, $ADRY_{i+1}=ADRY_i+1$ $ADRX_{i+1}=ADRX_i+1$ [Equation 4]

When $D_i=100$, $ADRY_{i+1}=ADRY_i+1$ $ADRX_{i+1}=ADRX_i$ [Equation 5]

When $D_i=101$, $ADRY_{i+1}=ADRY_i+1$ $ADRX_{i+1}=ADRX_i-1$ [Equation 6]

When $D_i=110$, $ADRY_{i+1}=ADRY_i$ $ADRX_{i+1}=ADRX_i-1$ [Equation 7]

When $D_i=111$, $ADRY_{i+1}=ADRY_i-1$ $ADRX_{i+1}=ADRX_i-1$ [Equation 8]

On the basis of a value of the data on scanning direction $D_i$, the row address $ADRY_{i+1}$ and the column address $ADRX_{i+1}$ contained in the next read-out address $ADR_{i+1}$ can be calculated in accordance with either of the above-described equations 1 to 8. A piece of composite data containing a piece of the next pixel data can be read from the image memory 200 on the basis of the value of the address $ADR_{i+1}$ thus calculated.

As described above, the starting point designating mode is advantageous as follows: namely, only by giving an address of a starting pixel, an address of a pixel to be read out next time can be automatically generated on the basis of additional information data, that is, data on scanning direction associated with each pixel, with a result that pieces of pixel data of all pixels in a desired object can be sequentially read out. This makes it possible to facilitate the control of reading pieces of pixel data of all pixels in a desired object.

As described above, according to the image data processing apparatus in this embodiment, the ordinary operation mode and the starting point designating mode are provided. Under the ordinary mode, among pieces of pixel data stored in the image memory 200, a specific piece of pixel data and additional information data associated with the pixel data are accessed on the basis of an address ADR0 inputted from external. Under the starting point designating mode, an address of a starting pixel is designated from external, and on the basis of the address, a piece of pixel data of the starting pixel and additional information data associated with the pixel data are read out; and an address of a pixel to be read out next time is generated on the basis of the additional information data thus read out by the address generating circuit 220. Accordingly, only by designating a starting pixel, an address of each of all pixels in a desired object can be automatically updated, with a result that pieces of pixel data of all the pixels in the object can be sequentially read out. This makes it possible to facilitate the control of reading pieces of pixel data of all pixels in a desired object.

While a preferred embodiment of the invention has been described using specific terms, such description is for illustrative purposes only, and it is to be understood that changes and variations may be made without departing from the spirit or scope of the following claims.

What is claimed is:

1. A semiconductor device comprising:
   a memory configured to store therein a unit of composite data, said unit of composite data including
      a main data component configured to hold main data, and
      an additional information component, configured to hold therein additional information related to said main data; and
   an access mechanism configured to provide at least one of read and write memory access for the unit of composite data, wherein
   the main data component and the additional information component are handled as a unit by said access mechanism, and
   said additional information component when read from memory is fedback for use in a subsequent memory access operation.

2. The semiconductor device of claim 1, wherein:
   the memory and the access mechanism are formed on a same semiconductor chip.

3. The semiconductor device of claim 2, wherein:
   said additional information of said additional information component including motion vector information, said motion vector information being descriptive of interframe movement of a feature of an image, said interframe movement being a movement from a previously accessed image frame to a yet to be accessed image frame.

4. The semiconductor device of claim 2, wherein:
main data being pixel data; and
said additional information of said additional information component including flag information, said flag information being indicative of an image resolution.

5. A semiconductor device comprising:
a memory configured to store therein a unit of composite data, said unit of composite data including
  a main data component configured to hold main data, and
  an additional information component, configured to hold therein additional information related to said main data; and
an access mechanism configured to provide at least one of read and write memory access for the unit of composite data, wherein
the main data component and the additional information component are handled as a unit by said access mechanism, wherein
said access mechanism includes
an address generating mechanism configured to generate an address for reading a second unit of said composite data based on said additional information component of a first unit of composite data.

6. The semiconductor device of claim 5, wherein:
said additional information component of the first unit of composite data includes an address for said access mechanism to access said second unit of composite data.

7. The semiconductor device of claim 6, wherein:
said address being an absolute address in said memory.

8. The semiconductor device of claim 6, wherein:
said address being a relative address in said memory.

9. An image data processing apparatus comprising:
a memory configured to store therein a unit of composite data, said unit of composite data including
  a pixel data component configured to hold pixel data, and
  an additional information component, configured to hold therein additional information related to said pixel data; and
an access mechanism configured to read the unit of composite data, the pixel data component and the additional information component being handled as a unit by said access mechanism,
a separating mechanism configured to separate said composite data, which has been read out by said access mechanism, into said pixel data and said additional information, and
a data processing section configured to perform a predetermined processing operation on said pixel data using said additional information data, wherein said additional information component when read from memory is fedback for use in a subsequent memory access operation.

10. An image data processing apparatus comprising:
a memory configured to store therein a unit of composite data, said unit of composite data including
  a pixel data component configured to hold pixel data, and
  an additional information component, configured to hold therein additional information related to said pixel data; and
an access mechanism configured to read the unit of composite data, the pixel data component and the additional information component being handled as a unit by said access mechanism;
a separating mechanism configured to separate said composite data, which has been read out by said access mechanism, into said pixel data and said additional information;
a data processing section configured to perform a predetermined processing operation on said pixel data using said additional information data;
a first data generation mechanism configured to generate said additional information data based on image data input thereto; and
a second data generation mechanism configured to generate said unit composite data to contain said additional information data and said pixel data, and supply said unit of composite data to said memory.

11. An image data processing apparatus comprising:
a memory configured to store therein a unit of composite data, said unit of composite data including
  a pixel data component configured to hold pixel data, and
  an additional information component, configured to hold therein additional information related to said pixel data; and
an access mechanism configured to read the unit of composite data, the pixel data component and the additional information component being handled as a unit by said access mechanism,
a separating mechanism configured to separate said composite data, which has been read out by said access mechanism, into said pixel data and said additional information, and
a data processing section configured to perform a predetermined processing operation on said pixel data using said additional information data, wherein
said additional information data is a motion vector, and
said data processing section is configured to
separate said composite data into said pixel data and said motion vector,
set a search region used for motion estimation on the basis of said motion vector, and
estimate a motion of said image portion corresponding to said pixel data in said search region.

12. An image data processing apparatus according to claim 11, wherein:
said data processing section is configured to perform a block matching process to estimate the motion in said search region.

13. An image data processing apparatus comprising:
a memory configured to store therein a unit of composite data, said unit of composite data including
  a pixel data component configured to hold pixel data, and
  an additional information component, configured to hold therein additional information related to said pixel data; and
an access mechanism configured to read the unit of composite data, the pixel data component and the additional information component being handled as a unit by said access mechanism,
a separating mechanism configured to separate said composite data, which has been read out by said access mechanism, into said pixel data and said additional information, and
a data processing section configured to perform a predetermined processing operation on said pixel data of a first image resolution of a first image using said additional information data, wherein said additional information data is a flag data indicative of a second image resolution of a second image that includes image data that includes said pixel data, and said data processing section is configured to separate said composite data, which has been read out by said access mechanism, into said pixel data and said flag data, and select pixel data from said pixel data based on said flag data, to form said second image resolution that is different from the first image resolution.

14. An image data processing apparatus according to claim 13, further comprising:

a data generation mechanism configured to select the pixel data from said pixel data in said first image and add said flag data to the pixel data as pixel data for forming the second image, to generate said unit of composite data.

15. An image data processing apparatus according to claim 13, wherein:

said data processing section is configured to determine, based on said flag data, whether said pixel data associated with said flag data is a piece of pixel data for forming said second image, and select said pixel data based on a determination by the data processing section.

16. An image data processing apparatus comprising:

a memory configured to store therein a unit of composite data, said unit of composite data including a pixel data component configured to hold pixel data, and an additional information component, configured to hold therein additional information related to said pixel data; and an access mechanism configured to read the unit of composite data, the pixel data component and the additional information component being handled as a unit by said access mechanism, a separating mechanism configured to separate said composite data, which has been read out by said access mechanism, into said pixel data and said additional information, and a data processing section configured to perform a predetermined processing operation on said pixel data using said additional information data, wherein said additional information includes scanning direction data for indicating a position of another pixel data that, along with said pixel data of said unit of composite data, is part of an image object, said data processing section is configured to generate an address for reading said another pixel data that corresponds with a pixel adjacent to a pixel that corresponds to said pixel data of said unit of composite data based on said scanning direction data, and supplies said address to said access mechanism.

17. An image data processing apparatus according to claim 16, wherein:

a first pixel of a set of pixels that form said object is a starting pixel of which data is first read from the access mechanism, and said access mechanism is configured to receive a starting address from an external source and read pixel data of said first pixel based on said starting address.

18. An image data processing apparatus according to claim 17, further comprising:

an address selection mechanism configured to select said starting address from one of said data processing section and an external source.

19. An image data processing apparatus according to claim 18, wherein:

said address selection mechanism is configured to select said starting address from said external source when reading said unit of composite data of said starting pixel, and configured to select the address generated by said data processing section when reading units of composite data for pixels subsequent to said starting pixel.

20. A method for organizing image data, comprising steps of:

storing in memory a unit of composite data, said unit of composite data including a main data component configured to hold main data, and an additional information component, configured to hold therein additional information related to said main data; and providing via an access mechanism at least one of read and write memory access for the unit of composite data, wherein the main data component and the additional information component are handled as a unit by said access mechanism, and said additional information component when read from memory is fedback for use in a subsequent memory access operation.

21. The method of claim 20, wherein:

the memory and the access mechanism are formed on a same semiconductor chip.

22. The method of claim 21, wherein:

said additional information of said additional information component including motion vector information, said motion vector information being descriptive of interframe movement of a feature of an image, said interframe movement being a movement from a previously accessed image frame to a yet to be accessed image frame.

23. The method of claim 21, wherein:

main data being pixel data; and said additional information of said additional information component including flag information, said flag information being indicative of an image resolution.

24. A method for organizing image data, comprising steps of:

storing in memory a unit of composite data, said unit of composite data including a main data component configured to hold main data, and an additional information component, configured to hold therein additional information related to said main data; and providing via an access mechanism at least one of read and write memory access for the unit of composite data, wherein the main data component and the additional information component are handled as a unit by said access mechanism, wherein said providing step includes generating an address for reading a second unit of said composite data based on said additional information component of a first unit of composite data.

25. The method of claim 24, wherein:

said additional information component of the first unit of composite data includes an address for said access mechanism to access said second unit of composite data.

26. The method of claim 25, wherein:
said address being an absolute address in said memory.
27. The method of claim 25, wherein:
said address being a relative address in said memory.
28. A method for organizing image data, comprising steps of:
   storing in memory a unit of composite data, said unit of composite data including
      a pixel data component configured to hold pixel data, and
      an additional information component, configured to hold therein additional information related to said pixel data, and
   reading the unit of composite data, the pixel data component and the additional information component being retrieved as a unit;
   separating said composite data into said pixel data and said additional information, and
   processing said pixel data using said additional information data, wherein said additional information component when read from memory is fedback for use in a subsequent memory access operation.
29. A method for organizing image data, comprising steps of:
   storing in memory a unit of composite data, said unit of composite data including
      a pixel data component configured to hold pixel data, and
      an additional information component, configured to hold therein additional information related to said pixel data, and
   reading the unit of composite data, the pixel data component and the additional information component being retrieved as a unit;
   separating said composite data into said pixel data and said additional information, and
   processing said pixel data using said additional information data;
   generating said additional information data based on image data input thereto; and
   generating said unit composite data to contain said additional information data and said pixel data, and supplying said unit of composite data to said memory.
30. A method for organizing image data, comprising steps of:
   storing in memory a unit of composite data, said unit of composite data including
      a pixel data component configured to hold pixel data, and
      an additional information component, configured to hold therein additional information related to said pixel data, and
   reading the unit of composite data, the pixel data component and the additional information component being retrieved as a unit;
   separating said composite data into said pixel data and said additional information; and
   processing said pixel data using said additional information data, wherein
   said additional information data is a motion vector; and further comprising steps of separating said composite data into said pixel data and said motion vector,
      setting a search region used for motion estimation based on said motion vector, and
      estimating a motion of said image portion corresponding to said pixel data in said search region.
31. The method of claim 30, wherein:
said estimating step includes performing a block matching process to estimate the motion in said search region.
32. A method for organizing image data, comprising steps of:
   storing in memory a unit of composite data, said unit of composite data including
      a pixel data component configured to hold pixel data, and
      an additional information component, configured to hold therein additional information related to said pixel data, and
   reading the unit of composite data, the pixel data component and the additional information component being retrieved as a unit;
   separating said composite data into said pixel data and said additional information; and
   processing said pixel data using said additional information data, wherein
   said additional information data is a flag data indicative of a first image resolution of a first image that includes image data that includes said pixel data; and further comprising steps of
   separating said composite data into said pixel data and said flag data, and
   selecting said pixel data from other pixel data based on said flag data, to form a second image resolution that is different from the first image resolution.
33. The method of claim 32, further comprising:
   selecting the pixel data from the other pixel data in said first image;
   adding said flag data to said pixel data as second pixel data; and
   generating said unit of composite data.
34. The method of claim 32, further comprising:
   determining, based on said flag data, whether said pixel data associated with said flag data is a piece of pixel data for forming said second image, and
   selecting said pixel data based on a determination in said determining step.
35. A method for organizing image data, comprising steps of:
   storing in memory a unit of composite data, said unit of composite data including
      a pixel data component configured to hold pixel data, and
      an additional information component, configured to hold therein additional information related to said pixel data, and
   reading the unit of composite data, the pixel data component and the additional information component being retrieved as a unit;
   separating said composite data into said pixel data and said additional information; and
   processing said pixel data using said additional information data, wherein
   said additional information includes scanning direction data for indicating a position of another pixel data that, along with said pixel data of said unit of composite data, is part of an image object; further comprising a step of
   generating an address for reading said another pixel data that corresponds with a pixel adjacent to a pixel that corresponds to said pixel data of said unit of composite data based on said scanning direction data, and supplying said address to an access mechanism.

36. The method of claim 35, wherein:

a first pixel of a set of pixels that form said object is a starting pixel of which data is first read, and further comprising a step of receiving from an external source a starting address from reading said first pixel as a component of a first unit of composite data for said image object.

37. The method of claim 36, further comprising a step of:

selecting said starting address from one of a data processing section and from an external source.

38. The method of claim 37, wherein:

said selecting step selects said starting address from said external source when reading said unit of composite data of said starting pixel, and selects said address generated by said data processing section when reading units of composite data for pixels subsequent to said starting pixel.

39. A semiconductor device comprising:

storing means for storing a unit of composite data containing a piece of main data and additional information data in accordance with said main data; and accessing means for reading said composite data stored in said storing means or writing said composite data to said storing means, wherein the main data component and the additional information component are handled as a unit by said accessing means, wherein said additional information component when read from memory is fedback for use in a subsequent memory access operation.

* * * * *